United States Patent [19]
Liu et al.

[11] Patent Number: 5,148,445
[45] Date of Patent: Sep. 15, 1992

[54] HIGH POWER ND:YLF SOLID STATE LASERS

[75] Inventors: Kuo-Ching Liu, Setauket; Sten Tornegard; Michael Rhoades, both of Smithtown, all of N.Y.

[73] Assignee: Quantronix Corp., Smithtown, N.Y.

[21] Appl. No.: 588,999

[22] Filed: Sep. 26, 1990

Related U.S. Application Data

[63] Continuation-in-part of Ser. No. 421,585, Oct. 16, 1989, which is a continuation-in-part of Ser. No. 342,410, Apr. 24, 1989.

[51] Int. Cl.$^5$ .............................. H01S 3/082
[52] U.S. Cl. ........................ 372/97; 372/33; 372/68; 372/70; 372/71; 372/106
[58] Field of Search ............... 372/97, 33, 68, 106, 372/40, 41

[56] References Cited

U.S. PATENT DOCUMENTS

| | | | |
|---|---|---|---|
| 3,242,440 | 3/1966 | Koester et al. | 372/97 |
| 3,258,717 | 6/1966 | Katzman | 372/68 |
| 3,379,998 | 4/1968 | Soules et al. | 372/68 |
| 3,484,714 | 12/1969 | Koester et al. | 372/33 |
| 3,628,180 | 12/1971 | Segre | 372/97 |
| 3,629,723 | 12/1971 | Snitzer | 372/33 |
| 4,352,186 | 9/1982 | Kuppenheimer, Jr. | 372/41 |
| 4,847,850 | 7/1989 | Kafka et al. | 372/10 |

OTHER PUBLICATIONS

OSA Meeting Announcement WL15, Sep., 1989 issue of *Optics News*.

Vanherzeele, H., "Continuous wave dual rod Nd:YLF laser with dynamic lensing compensation," *Applied Optics*, vol. 29, No. 19, Oct. 1, 1989.

Abstract WL15 "High Power cv Nd:YLF laser with dynamic compensation of the thermal lensing astigmatism" Annual Meeting OSA, Oct. 16, 1989.

*Primary Examiner*—Georgia Y. Epps
*Attorney, Agent, or Firm*—Darby & Darby

[57] ABSTRACT

A high power TEM$_{00}$ mode Nd:YLF solid state laser includes at least two pumped Nd:YLF solid state rods in series within a laser resonator. A spherical lens may be incorporated within the resonator as required for establishing, in concert with the rods and resonator end mirrors, a large intracavity beam diameter at the position of the rods. A cylindrical lens may be provided to compensate for astigmatic thermal focusing of the Nd:YLF rods, or else the rods may be used in pairs, in which case the rods are rotated by 90° about the laser axis with respect to each other, and a half-wave plate is inserted between the rods of each pair to maintain oscillation at a single wavelength.

12 Claims, 1 Drawing Sheet

HIGH POWER ND:YLF SOLID STATE LASERS

CROSS REFERENCE TO RELATED APPLICATIONS

This is a continuation-in-part of U.S. patent application Ser. No. 07/421,585, filed Oct. 16, 1989, which is a continuation-in-part of U.S. patent application Ser. No. 07/342,410, filed Apr. 24, 1989.

BACKGROUND OF THE PRESENT INVENTION a. Field of the Invention

This invention relates to solid state lasers. More specifically, the invention is directed to an improved solid state laser including a plurality of solid state lasing elements, each having low thermal focusing and low thermal birefringence loss, which improved laser produces increased $TEM_{00}$ mode power.

b. Background of the Pertinent Art

High power $TEM_{00}$ solid state laser output, either continuous wave (CW) or Q-switched, is required for many commercial, scientific research and development applications. For example, diamond inscribing, laser engraving, soldering and welding applications and thick film hybrid circuit trimming operations require high power laser output. Numerous other industrial and scientific applications would also benefit if higher power laser output could be economically and practically employed.

A large mode volume in the solid state lasing crystal, i.e., utilizing as large a fraction of the laser crystal's active volume, is a critical requirement in achieving high power, low order mode laser output. Unfortunately, the mode volume in neodymium (Nd) doped yttrium aluminum garnet (YAG), commonly denoted as Nd:YAG, the most popular solid state lasing crystal, has been limited by the properties of that material known as thermally-induced focusing and thermal birefringence loss.

Thermally-induced focusing or thermal lensing results from the quadratic variation in the refractive index of the Nd:YAG rod as a function of distance from its central axis. This variation follows, via the large positive dn/dT, from the quadratically varying temperature dependence which results when a uniformly pumped (and heated) cylindrical rod is cooled on its cylindrical surface. Since the effective focal length of a highly pumped rod can be as short as 20-30 cm (i.e., approaching the rod length), the establishment of large mode volumes and the use of multiple rods within a single resonator is made difficult.

In addition, the radial temperature distribution results, via the thermal expansion coefficient, in a varying stress distribution. This stress produces, through the photoelastic effect, a birefringence in the normally optically isotropic Nd:YAG rod. This thermal birefringence causes a depolarization and hence an intracavity loss for a $TEM_{00}$ mode beam as this mode is necessarily linearly polarized. Since this loss varies quadratically as a function of radial position from the rod center, the thermal birefringence also limits mode volume and thereby $TEM_{00}$ mode power.

Therefore, CW $TEM_{00}$ power over 30 watts remains unavailable from any commercial solid state laser system today.

Certain characteristics of the crystal $Nd:LiYF_4$ (referred to herein as Nd:YLF) have been shown in recent studies to make Nd:YLF advantageous for use as an active lasing element. This crystal has been shown to demonstrate very low thermal focusing and, because it is a uniaxial crystal, its natural birefringence dominates the relatively small thermal birefringence so that thermal birefringence loss is negligible. In addition, Nd:YLF lasers have achieved $TEM_{00}$ power outputs comparable to Nd:YAG lasers with equivalent sized rods.

Thermal focusing in Nd:YLF laser rods, however, although small, is astigmatic, i.e., its magnitude and sign are different in the orthogonal radial directions of the crystal â and axes in a typical laser rod whose other â axis is along the cylinder axis. This can be corrected by utilizing a cylindrical lens to produce an output beam that is circularly symmetrical. Such a cylindrical lens is used in addition to a spherical lens normally used to expand beam diameter so as to obtain larger mode volumes.

SUMMARY OF THE INVENTION

In accordance with the invention, a high power solid state laser comprises a laser resonator and a plurality of solid state laser rods mounted in pumping chambers within the resonator. The rods are arranged in series and are constructed of a material having low thermal focusing and low thermal birefringence loss, as compared with the thermal focusing and thermal birefringence loss of Nd:YAG. A lens means is arranged within the resonator and between the rods for establishing a large intracavity beam diameter with respect to the laser rod diameter and, thus, a large active lasing volume in the rods. By appropriately selecting the radii of curvature of the resonator end reflectors, the focal power of the lens means and various distances between system components, a Gaussian ($TEM_{00}$ mode) beam intensity distribution is provided whose diameter is a substantial fraction of the laser rod diameter. That is, high laser output power is extracted from a substantial portion of the rod volume, and thus higher $TEM_{00}$ laser output power is achieved.

It is thus seen that an object of the present invention is to increase the $TEM_{00}$ power output of solid state lasers using solid state lasing crystals which exhibit low thermal focusing and low thermal birefringence loss.

Another object of the present invention is to increase the power output of Nd:YLF solid state lasers.

Here, the laser rods are comprised of Nd:YLF and the laser polarization is aligned along the crystal a axes of the rods to produce, typically, laser output at 1053 nanometers (nm). In one embodiment, a cylindrical lens is employed to correct the astigmatic thermal focusing of the rods.

In another preferred embodiment, the two Nd:YLF laser rods are arranged in series and aligned colinearly with the radial â axes of the rods rotated 90° from one another, in order to take advantage of the oppositely signed astigmatic thermal focusing of the material on the radial â and axes. In other words, astigmatic focusing of the beam by the first rod in the pair is corrected by the opposite astigmatic focusing of the beam by the second rod so that a circularly symmetrical output beam is created. It will be appreciated that this correction or compensation is dynamic, i.e., it operates at all laser output levels. In this embodiment, a half-wave plate is aligned colinearly and positioned between the rods and is oriented to rotate the laser polarization by 90° in order to maintain the appropriate laser resonance wavelength (1053 nm) in the resonator.

Thus, a further object of the present invention is to produce a circularly symmetrical output beam without the use of a cylindrical lens.

For a better understanding of the preferred embodiments of the present invention, reference is made to the following detailed description and accompanying drawing.

DESCRIPTION OF THE PREFERRED EMBODIMENTS

Figure 1:
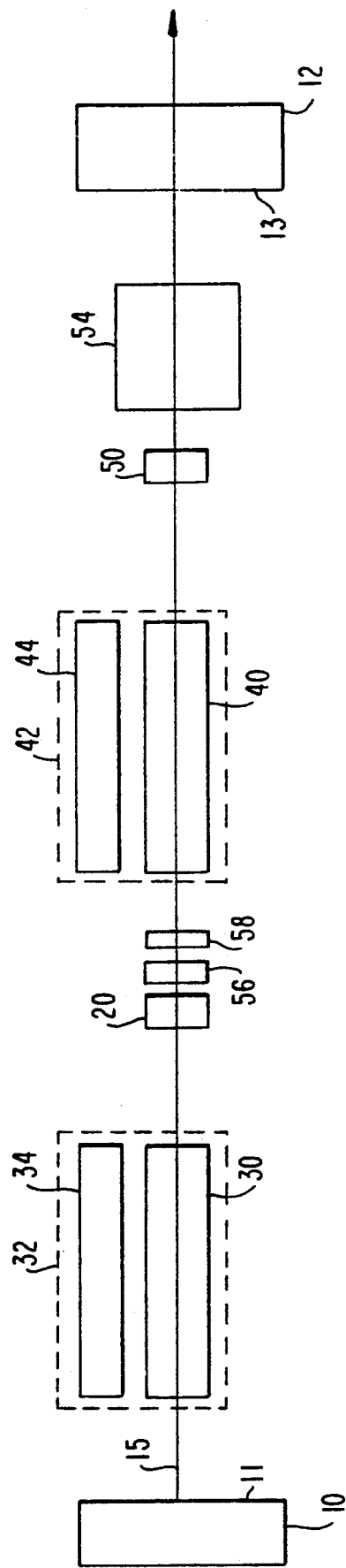
FIG. 1 is a representational view of certain components of the laser of the present invention.

In order to increase $TEM_{00}$ mode volume in a solid state laser, it is necessary to utilize as large a fraction of the cross-sectional area of the active laser as possible. However, in prior art Nd:YAG lasers this increase in beam diameter (and area) has been limited by thermally-induced focusing and birefringence loss. This limitation of beam expansion is overcome according to the present invention by the use of Nd:YLF rods, which have very low thermal focusing and nearly zero birefringence loss.

In FIG. 1 there is shown a plurality of Nd:YLF laser rods placed in series inside a resonator in order to effectively increase the overall rod length. The laser components are arranged so as to achieve a large active lasing volume and, thereby, a higher $TEM_{00}$ laser output. Generally, FIG. 1 shows first and second energy reflecting means 10, 12, which are preferably mirrors having predetermined radii of curvature. The means 10, 12 are coaxially disposed along an optical axis 15 and are separated by a predetermined distance. Energy reflecting means 10 is preferably a high-reflectance mirror and means 12 is preferably an output, i.e., partially transmissive (up to 20%) mirror. The mirrors are preferably dielectric coatings on fused quartz substrates, as is conventional.

A lens means 20, which may be a conventional spherical lens, has a predetermined focal power and is coaxially disposed between the energy reflecting means 10, 12, with these three components defining a laser resonator. As thus described, the laser resonator may be in the form of the laser resonators generally designated as the "QUANTRONIX 4000 Series," manufactured and sold by Quantronix Corporation of Smithtown, N.Y.

Positioned coaxially within the resonator are two substantially identically sized and shaped Nd:YLF crystal rods 30, 40. The rods are circular in cross section. In this preferred embodiment, the rods are each 4 millimeters in diameter by 79 millimeters long. The rods 30, 40 are mounted in pumping chambers 32, 42, in which light pumping sources 34, 44 are also disposed for pumping the crystal rods 30, 40, as is conventional. Light pumping sources 34, 44 may comprise, for example, conventional krypton arc lamps. Laser "heads" suitable for use in the present invention are the QUANTRONIX Model 116 units, available from Quantronix Corporation of Smithtown, N.Y.

Optionally but advantageously present in the laser of the preferred embodiment are a Brewster plate polarizer 50 and a Q-switch 54 which may be either acousto-optic or electro-optic. Details of construction and the manner of inclusion of these components into a laser resonator is well known to those of ordinary skill in the art, as is the use of a mode-lock modulator instead of a Q-switch to provide mode-locked output, if so desired.

Because the Nd:YLF rods 30, 40 exhibit some small amount of thermal focusing, the nature of which will be discussed in more detail below, certain of the components already described are designed and positioned to provide a large intracavity beam diameter at the position of the laser rods.

As already noted, thermal focusing in Nd:YLF laser rods is small but astigmatic, i.e., its magnitude and sign are different in the orthogonal directions of the crystal â and axes. This difference in magnitude and sign may be handled by inserting a cylindrical lens 56 into the resonator in addition to the previously described spherical lens means 20. In this case, the radial â and axes of the two rods 30, 40 are aligned. The output beam produced when such a cylindrical lens 56 is added into the resonator is circularly symmetrical in the radial cross sectional plane of the beam. Equivalently, the desired correction could be achieved with the use of a compound cylindrical-spherical lens in place of the simple spherical lens means, with the cylindrical axis aligned to compensate for the astigmatism.

A CW Nd:YLF laser according to the invention, including a cylindrical lens having focal length of 130 cm to correct for astigmatic thermal focusing, produced $TEM_{00}$ laser output of 40 watts, a larger power output than any reported value prior to the present invention.

It should be understood that there is no theoretical limit on the present invention to a design including only two Nd:YLF rods. A plurality of such pumping chambers including such rods may be operated in series, well within the spirit and scope of the invention. The only substantial practical limitations are the amount of available intracavity space and available input power.

An alternative to the use of the intracavity cylindrical lens is available when an even number of Nd:YLF laser rods, e.g., two, four, six, etc., are used in the resonator. Referring to FIG. 1 again, by rotating a first one 30 of each pair of two rods 90° about the axis 15 relative to the second 40, astigmatic focusing of the beam by one rod can be used to compensate for the astigmatic focusing of the beam by the other. Such rotation of one rod with respect to another, however, results in mismatch of the beam polarization with respect to the crystal axis for appropriate laser oscillation at the 1053 nm wavelength.

In particular, it is known that a beam polarized along the crystal â axis will oscillate at 1053 nm wavelength, while a beam polarized along the crystal axis will resonate at 1047 nm wavelength.

This misalignment of the crystal axes of the two rods 30, 40 is overcome according to the invention by inserting a half-wave plate 58 (at the 1053 nm laser wavelength) between the two rods 30, 40. The cylindrical lens 56 shown in FIG. 1 is not required in such an embodiment. A beam linearly polarized in the first rod 30 along the crystal â axis is thus effectively rotated by 90° so as to be linearly polarized along the crystal â axis in the second rod 40, keeping in mind that the rods themselves have been rotated about the axis 15 by 90° with respect to each other in this preferred embodiment. Thus, the beam is appropriately polarized for 1053 nm oscillation in both rods 30, 40.

In this way, assuming uniformly dynamic astigmatic thermal focusing from rod to rod, the total intracavity focusing is circularly symmetrical for each pair of rods in the resonator. Thus, astigmatic thermal focusing is compensated without the need for a cylindrical lens.

A CW Nd:YLF laser with two crystal rods, constructed according to this embodiment of the invention, has produced a circularly symmetrical beam delivering over 30 watts of $TEM_{00}$ mode output power.

A preferred embodiment of the invention using dual rotated rods for dynamic compensation of astigmatic thermal lensing is currently manufactured and sold by Quantronix Corporation of Smithtown, N.Y., and is designated as "Model 4216-D" which is a particular one of the QUANTRONIX 4000 Series lasers. In this laser, the energy reflecting means 10, 12 have convex reflective surfaces 11, 13, with the radius of curvature of each being 120 centimeters. Surface 11 is a high reflector while surface 13 is preferably twelve percent transmissive, as is customary in Nd:YAG lasers as well. Lens means 20 may be a conventional spherical lens having focal length, f, of 50 cm. The energy reflecting means 10, 12 are preferably spaced apart at a distance of 189.5 centimeters, and the lens means 20 is positioned 97.5 centimeters from the high reflector 10. The cylindrical Nd:YLF laser rods 30, 40, each 4 mm×79 mm, are spaced at 82 cm and 113 cm from the high reflectance means 10. The half-wave plate 58 is adjacent the spherical lens means 20. Other conventional laser system components, including a mode-locker, Brewster plate polarizer, shutter and mode-selecting aperture are preferably employed in known fashion.

With this arrangement, the Gaussian beam diameter at the rods is a substantial fraction, i.e., sixty to seventy percent, of the laser rod diameter.

It should be understood that this overall design technique may also be employed with more than two rods, so long as an even number of rods are used, i.e., in multiple rod/halfwave plate/rod segments.

While the invention above has been described only in terms of CW lasers, it is obvious that an intracavity Q-switch or mode lock modulator, either acousto-optic or electro-optic and activated by an appropriate driver, can be added to produce a Q-switched or a mode-locked laser output.

While the foregoing description and accompanying drawing represent the preferred embodiments of the present invention, it will be obvious to those skilled in the art that various changes and modifications may be made therein without departing from the true spirit and scope of the present invention.

We claim:

1. A solid state laser comprising:
    a first energy reflecting means having a first predetermined radius of curvature and a second energy reflecting means having a second predetermined radius of curvature disposed facing each other along a laser axis and separated by a predetermined separation;
    lens means coaxially disposed at a predetermined position between the first and second energy reflecting means and defining, with the first and second energy reflecting means, a laser resonator, the lens means having a predetermined focal power;
    a first pumping chamber disposed between the first energy reflecting means and the lens means, including a first solid state uniaxial crystal laser rod coaxially positioned within the laser resonator, the first laser rod having a predefined crystal axis; and
    a second pumping chamber disposed between the second energy reflecting means and the lens means, including a second solid state uniaxial crystal laser rod coaxially positioned within the laser resonator, the second laser rod having a predefined crystal axis;
    wherein the predetermined separation, and first and second predetermined radii of curvature, and predetermined position, and predetermined focal power are selected so that a $TEM_{00}$ mode laser beam diameter within the laser resonator at the first and second laser rods is a substantial fraction of the diameter of the laser rods,
    wherein the laser rods are aligned so that the predefined crystal axis in the first rod is rotated by 90° about the laser axis with respect to the predefined crystal axis of the second rod;
    further comprising means between the laser rods for rotating only a particular beam polarization 90° as the beam passes between the laser rods.

2. The laser of claim 1, wherein the lens means is a spherical lens.

3. The laser of claim 1 wherein the first and second energy reflecting means are convex and have radii of curvature of about 120 centimeters.

4. The laser of claim 1, wherein said laser rods are cylindrical Nd:YLF crystal rods about 4 mm in diameter by about 79 mm in length, the lens means is a spherical lens having focal length of 50 cm, and the first and second energy reflecting means are convex and have radii of curvature of about 120 cm and are spaced apart about 189.5 centimeters.

5. The laser of claim 1 further comprising:
    Q-switch means including Q-switch driver means, or mode lock means including mode lock driver means, for providing mode-locked or Q-switched laser output, coaxially disposed in the resonator along the laser axis.

6. The laser of claim 1 further comprising:
    at least a third pumping chamber disposed in the resonator between the first energy reflecting means and first pumping chamber, including a third solid state laser rod made of a material having low thermal focusing and low thermal birefringence, the third solid state laser rod coaxially positioned within the laser resonator; and
    a second lens means having a predetermined focal power, coaxially disposed at a predetermined position between the third and first solid state laser rods.

7. The laser of claim 1 wherein the means for rotating a beam polarization is a half-wave plate.

8. The laser of claim 1 further comprising:
    Q-switch means including Q-switch driver means, or mode lock means including mode lock driver means, for providing mode-locked or Q-switched laser output, coaxially disposed in the resonator along the laser axis.

9. The laser of claim 1 further comprising:
    at least third and fourth pumping chambers disposed in the resonator between the first energy reflecting means and first pumping chamber, including third and fourth solid state uniaxial crystal laser rods, respectively, the third and fourth solid state laser rods coaxially positioned within the laser resonator; and
    means between the third and fourth laser rods for rotating only a particular beam polarization 90° as the beam passes between the third and fourth laser rods.

10. The laser of claim 7 wherein the first and second uniaxial crystal laser rods are Nd:YLF rods.

11. The laser of claim 10 wherein the Nd:YLF rods have a beam polarization along their â axes at a wavelength of 1053 nanometers.

12. The laser of claim 11 wherein the means for rotating a beam polarization is a half-wave plate at a wavelength of 1053 nanometers.

* * * * *

UNITED STATES PATENT AND TRADEMARK OFFICE
CERTIFICATE OF CORRECTION

PATENT NO. : 5,148,445

DATED : September 15, 1992

INVENTOR(S) : Kuo-Ching Liu, Sten Tornegard & Michael Rhoades

It is certified that error appears in the above-identified patent and that said Letters Patent is hereby corrected as shown below:

Column 2, line 12, before "axes" insert -- ê --;
          line 60, before "axes" insert -- ê --.

Column 4, line 12, before "axes" insert -- ê --;
          line 15, before "axes" insert -- ê --;
          line 51, before "axes" insert -- ê --.

Signed and Sealed this

Nineteenth Day of December, 1995

Attest:

BRUCE LEHMAN

*Attesting Officer*    *Commissioner of Patents and Trademarks*